United States Patent [19]

Moro et al.

[11] 4,303,526

[45] Dec. 1, 1981

[54] HYDROCYCLONE SEPARATOR

[75] Inventors: Tadao Moro, Ichikawa; Hiroshi Sakamoto, Kawaguchi; Mitsuru Yamamoto, Matsudo; Toshimitsu Kokubo, Komae; Kaoru Masuda, Kawaguchi, all of Japan

[73] Assignee: Agency of Industrial Science & Technology, Tokyo, Japan

[21] Appl. No.: 138,666

[22] Filed: Apr. 9, 1980

Related U.S. Application Data

[63] Continuation of Ser. No. 11,690, Feb. 12, 1979, abandoned.

[51] Int. Cl.[3] .................... B01D 21/26; B01D 33/02

[52] U.S. Cl. .............................. 210/512.3; 209/144; 209/211

[58] Field of Search ................ 210/512 R, 304, 512.1, 210/512.3; 209/144, 211; 55/430

[56] References Cited

U.S. PATENT DOCUMENTS 816,460 3/1906 Geisendorfer et al. .............. 55/430

3,417,871 12/1968 Arnold .............................. 209/211

*Primary Examiner*—Frank Sever

*Attorney, Agent, or Firm*—Lane, Aitken, Kice & Kananen

[57] ABSTRACT

A hydrocyclone separator for liquid suspensions, particularly useful for the separation of highly concentrated slurries, the separator being provided with a forced discharge means in the form of a screw conveyor extending axially through the underflow discharge end of the hydrocyclone for forcibly discharging highly concentrated underflow fractions which would otherwise tend to stagnate in the underflow nozzle to cause choking thereof. An air column is maintained in the hydrocyclone by feeding air thereinto through the rotational axis of the screw conveyor which is driven by a variable speed motor, controlling rotational speed of the conveyor drive axis and the inspiratory air pressure according to the conditions of the feed slurry.

3 Claims, 2 Drawing Figures

HYDROCYCLONE SEPARATOR

This is a continuation of application Ser. No. 11,690, filed Feb. 12, 1979, now abandoned.

BACKGROUND OF THE INVENTION (1) Field of Invention

This invention relates to hydrocyclone separators for liquid suspensions, and more particularly to a hydrocyclone separator which is capable of treating highly concentrated slurries with versatile components.

(2) Description of Prior Art

In the treatment of urban refuse, as a pretreatment for the waste paper refining or prior to methane fermentation of organic waste materials such as kitchen garbage, the urban refuse is added to water to make a slurry which contains large amounts of paper, kitchen garbage and other fibrous materials, and then heavy extraneous components such as glass, stones, metals and the like are separated from the slurry. However, it has been revealed by a number of experiments that conventional hydrocyclone separators are incapable of handling such a slurry and easily become inoperative due to choking of underflow nozzles. The slurry, which is undergoing the separating effects of the hydrocyclone, rapidly loses its flowability by thickening in the vicinity of the underflow discharge nozzle and stagnates there. If the discharge rate through the underflow nozzle is increased to avoid this, fragments of paper and kitchen garbage will flow out along with the underflow discharge, lowering the percentage of recovery which is the very purpose of the operation. On the other hand, if the slurry is fed to the hydrocyclone in a lower concentration to make the separation easier, it becomes necessary to conduct the treatment of a large amount of resulting waste water for environmental protection, which is economically a great disadvantage to the waste disposal system as a whole.

Thus, it has been difficult or almost impossible for the conventional hydrocyclone separators to conduct precise separation by imparting a high pressure to a slurry feed of high concentration or density.

It is therefore an object of the present invention to provide a hydrocyclone separator which has a screw conveyor type forced discharge means at the underflow discharge end and which can separate slurries of the type which falls in the operable range of ordinary hydrocyclones, as well as slurries of high concentration which contain heavy extraneous materials along with fibrous materials such as paper, kitchen garbage and the like, in a stable operating condition and with a high degree of separation.

It is another object of the present invention to provide a hydrocyclone separator with a screw conveyor type forced discharge means, which can effect the separation of slurries having a higher degree of concentration than slurries within the operating ranges common with ordinary conventional hydrocyclones.

It is a further object of the present invention to provide a hydrocyclone separator with a screw conveyor type forced discharge means which is driven by a variable speed motor to control the underflow discharge rate according to the conditions of the slurry to be treated.

It is a still further object of the present invention to provide a hydrocyclone separator with a screw conveyor type forced discharge means, which is further provided with an air supply passage extending axially through the rotational axis of the screw conveyor to feed air into the hydrocyclone for maintaining an air column therein to sustain an effective separation performance.

It is still another object of the present invention to provide a hydrocyclone separator which, in contrast to the conventional counterparts, in which only the size and the proportion of the hydrocyclone and the pressure of feed are the controllable factors and in which the pressure of feed is the sole variable factor in operation, additionally allows control of the discharge rate through the underflow nozzle and of the flow rate of air fed from the air feeder, thereby permitting control of the operating conditions with a higher degree of freedom to suit the particular property of the slurry to be treated.

SUMMARY OF THE INVENTION

According to the present invention, there is provided a hydrocyclone separator having a conical body and a cylindrical portion, and including an inlet for introducing a feed material tangentially into the cylindrical portion of the separator for separation into underflow and overflow fractions, and an underflow nozzle and an overflow finder provided at the apex terminus of the conical body and the base end of the cylindrical portion, respectively, the separator comprising a forced discharge means in the form of a screw conveyor extending axially through the underflow discharge end of the conical body for forcibly discharging concentrated heavy extraneous components through the underflow nozzle, the forced discharge means being rotatingly driven by a variable speed drive means.

The above and other objects, features and advantages of the present invention will become apparent from the following description and the appended claims, taken in conjunction with the accompanying drawings which show by way of example a preferred embodiment of the present invention.

DESCRIPTION OF PREFERRED EMBODIMENT

Figure 1:
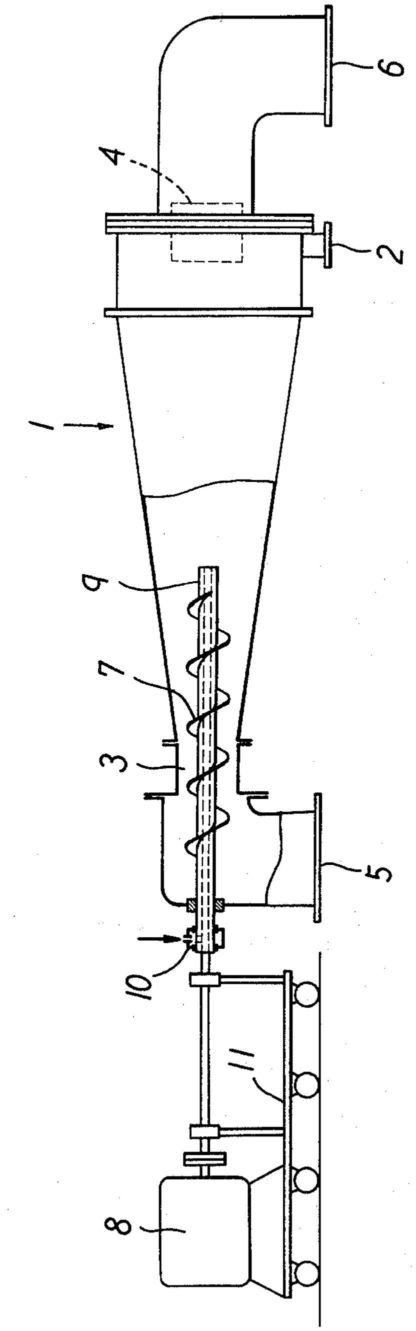
FIG. 1 is a schematic cutaway view of a hydrocyclone separator embodying the present invention.

Referring to FIG. 1, the separator according to the present invention employs a hydrocyclone 1 which includes in the usual manner an inlet 2 for introducing a feed material tangentially into a cylindrical portion of the hydrocyclone, and an underflow nozzle 3 and an overflow finder 4 provided at the apex terminus of the conical body and the base end of the cylindrical portion respectively. The underflow nozzle 3 and overflow finder 4 are respectively connected to an underflow discharge duct 5 and an overflow discharge pipe 6.

According to the present invention, the hydrocyclone 1 is provided with a forced underflow discharge means in the form of a screw conveyor 7 which is driven by a variable speed motor 8 for forcibly discharging through the underflow nozzle 3 the concentrated heavy extraneous materials containing bulky and coarse components. The screw conveyor type forced discharge means 7 has a hollow rotational axis 9 which also serves as a passage for feeding air into the hydrocyclone 1. The hollow rotational axis 9 is connected to an air supply pipe of an air feeder through a rotary joint indicated at 10. In the particular embodiment shown in FIG. 1, the variable speed motor 8 is mounted on a carriage 11 for moving the motor assembly axially together with the screw conveyor assembly for the adjustment of the position of the air feeding inner end of the rotational axis 9 relative to the hydrocyclone 1. However, the carriage 11 is not required in a case where there is no need for adjusting the position of the air feeding inner end of the rotational axis 9. In such a case, a spout of a suitable length may be connected to the inner end of the rotational axis 9 to extend to a suitable air feed position within the hydrocyclone 1. Furthermore, FIG. 1 shows a horizontally disposed hydrocyclone but similar arrangement is, of course, possible with vertically installed hydrocyclones.

Figure 2:
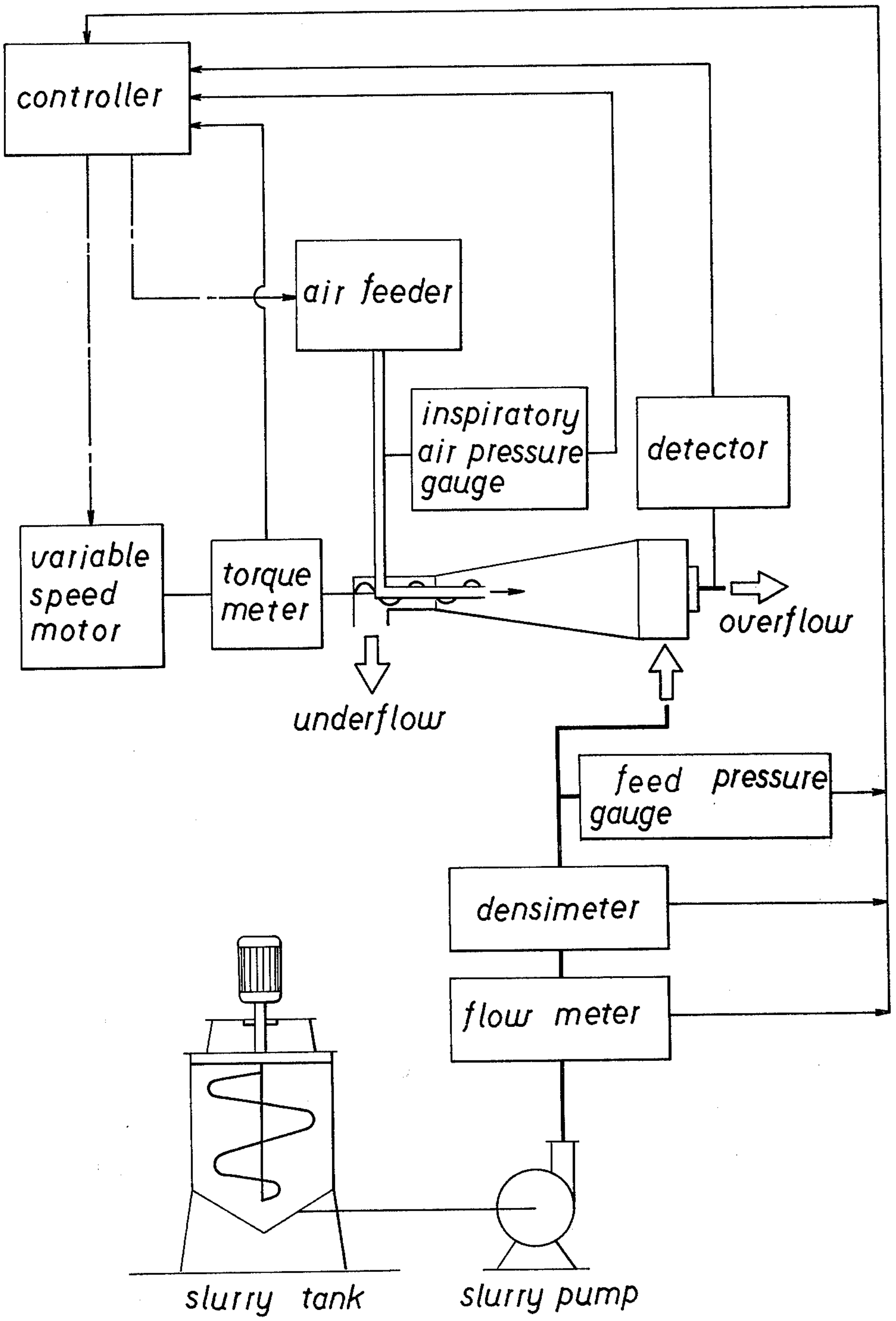
FIG. 2 is a block diagram of a control system for the separator of FIG. 1.

Referring now to FIG. 2 which shows in block diagram the control system for the hydrocyclone 1, a slurry in a slurry tank is pressurized to several kg/cm$^2$ by a slurry pump and fed to the inlet 2 of the hydrocyclone 1 through a flowmeter and a densimeter. The pressure of the slurry is also measured by a pressure gauge which is provided at a suitable position on the slurry feed line, and the electrical signals of the detected flow rate, density and pressure are fed to a controller as factors indicative of the feed slurry conditions.

A torque meter is mounted on the rotational axis 9 of the screw conveyor 7 and includes means for detecting the rotational speed of the screw drive axis. The electrical signals indicating the torque and rotational speed of the screw drive axis are also fed to the controller. An inspiratory air pressure gauge which is provided on the air supply line detects the pressure of air which is fed from the air feeder to the hydrocyclone for forming an air column in the latter, sending electrical signals indicative of the inspiratory air pressure likewise to the controller.

Where it is desired to maintain the overflow discharge of the hydrocyclone in constant concentration for a particular purpose, there may be provided a detector which is adapted to detect the specific gravity or concentration of the overflow slurry and to send a corresponding electrical signal to the controller. A similar detector may also be provided at the underflow end of the hydrocyclone to send underflow data to the controller.

The controller consists of a computer unit which processes the input signal from detectors and a controller unit which produces output signals according to the results of the computations for controlling the variable speed motor and the air feeder. The control of the rotational speed of the variable speed motor 8 is preferably effected through an electronic speed control mechanism operating according to the electrical output signals from the controller. However, arrangement may be made to control the motor through a mechanical speed changer. The control of the air feeder includes the control of the flow rate or pressure of air to be fed into the hydrocyclone.

The hydrocyclone and its control system operate in the following manner.

The hydrocyclone separator of the present invention is applicable not only to slurries of urban refuse but also to other liquid suspensions as handled by conventional hydrocyclones, and is particularly useful for treating a slurry which has a rather high concentration. For example, in the case of a slurry of urban refuse whose fluidity is determined by its paper content, the hydrocyclone separator of the invention can handle a slurry with a paper content of up to 5 to 6 wt %.

Further, since sludge in sewage has properties similar to those of urban refuse slurries, the hydrocyclone separator can be applied to take over part of the role which is performed by the primary settling basin in the sewage treatment. This greatly contributes to reduce the volume required for the primary settling basin.

Other applications of the hydrocyclone separator of the invention include recovery in high concentration of coarse fraction in a slurry of pit sand or other sand or earth. In this instance, the silt and clay components of the feed slurry are removed very easily, while the water content in the fraction of the coarse components is reduced to a considerable degree as compared with the values attained by conventional hydrocyclones. Further, the hydrocyclone separator of the invention is applicable to shield tunneling or to reverse circulation piling for the purpose of maintaining a constant concentration of the muddy water at the overflow end. In this case, the control of overflow concentration can be performed more effectively by providing a detector which is adapted to detect the specific gravity or concentration of the muddy water at the overflow end.

The slurry from the tank is pressurized by the slurry pump and introduced into the hydrocyclone 1 tangentially through the inlet 2, whereupon the slurry undergoes separation under the centrifugal effects which cause heavy extraneous materials of high settling rate, such as glass and stones, to carry toward the underflow nozzle 3 in concentrated state. The thus concentrated heavy extraneous materials are forcibly discharged by the screw conveyor 7 through the underflow nozzle 3 and underflow discharge duct 5.

On the other hand, materials of low settling rate, such as fragments of paper and kitchen garbage, silt and clay, are caused to flow out through the overflow finder 4 and overflow discharge pipe 6.

Even where the feed is a thick slurry, the separating action of the hydrocyclone is encouraged by the air column which is maintained by the air feed through the rotational axis 9 of the screw conveyor 7.

The underflow discharge rate through the underflow nozzle 3 is controlled by adjusting the speed of the variable speed motor 8 which drives the screw conveyor 7. Therefore, the operation can be adapted to suit the property of urban refuse which contains different ingredients in different seasons or places.

Before operating the cyclone, the initial operating conditions for the rotational speed of the screw conveyor drive axis and the air feed rate or initial pressure of feed air are determined on the basis of the flow rate, concentration and pressure of the feed slurry. When the torque of the screw conveyor drive axis and the inspiratory air pressure are varied greatly due to variations in the conditions of the feed slurry, the controller adjusts the rotational speed of the screw conveyor and the air feed rate according to a preset program to maintain the suitable operating conditions.

In the normal operating conditions of the cyclone, the torque of the screw conveyor drive axis shows almost constant values. However, the drive axis torque and the size of separation are increased with increases in the solid content of the feed slurry, allowing more solids to escape into the overflow fraction to increase the concentration thereof. On the contrary, the drive axis torque and the size of separation are reduced with reductions in the solid content of the feed slurry, lowering thickening effects on the underflow fraction. Under such circumstances, the controller increases or decreases the rotational speed of the drive motor 8 according to variations in the drive axis torque to restore normal operating conditions.

Moreover, in the normal operating conditions, the controller controls the air feeder such that the inspiratory air pressure is maintained at a constant value, for instance, at 0 kg/cm$^2$, the inspiratory air pressure however being fluctuated to the positive side by variations in the solid content of the feed slurry, raising the size of separation to lower the separation effects. On the contrary, when the fluctuation occurs toward the negative side, the concentration effect at the underflow end is lowered, though with almost no effect on the size of separation. In order to remove these adverse effects, the controller controls the rotational speed of the variable speed motor and, if necessary, the flow rate or pressure of feed air in such a manner as to maintain a constant inspiratory air pressure.

Thus, with the hydrocyclone separator according to the present invention, the underflow fraction which is concentrated toward the underflow nozzle is forcibly discharged by the forced discharge means, so that is becomes possible to conduct the separating operation stably without choking of the underflow nozzle even in the treatment of a slurry of high density. In addition, the control of the variable speed motor in relation with the torque of the screw drive axis realizes automatic operation which is adaptable to a wide range of feed materials and which can treat versatile material like urban refuse containing various coarse fragments of extraneous components, for example, for recovering fibrous material such as kitchen garbage and paper effectively from such urban refuse. The discharge rate through the underflow nozzle can be reduced to attain a higher concentration of the underflow fraction, which facilitates to mitigate the load for the treatment of waste water.

What is claimed is:

1. A hydrocyclone separator forming a closed end construction including a conical body and a cylindrical portion, and having an inlet provided at the circumference of said cylindrical portion for introducing a slurry of solid material in a liquid tangentially into said cylindrical portion for separation into underflow and overflow slurry fractions, an underflow nozzle connected to the apex terminus of said conical body and an overflow finder mounted on the base end of the cylindrical portion, said separator comprising a forced discharge means in the form of a screw conveyor extending axially through said underflow nozzle into said conical body for forcibly discharging concentrated heavy extraneous slurry components through said underflow nozzle, said screw conveyor being rotatingly driven by a variable speed drive means and having a hollow rotational axis comprising means for providing at least a portion of a passage of air to be fed into said conical body for maintaining an air column therein, said means enabling said passage of air to extend into said conical body a sufficient distance to minimize resistance to the flow of the slurry and to encourage the separating action of the hydrocyclone separator.

2. A hydrocyclone separator as set forth in claim 1, further comprising a controller which is adapted to control the drive speed of said forced discharge means in relation with the screw torque of said conveyor.

3. A hydrocyclone separator as set forth in claim 2, wherein said controller is adapted to control the drive speed of said forced discharge means in relation with the screw torque of said conveyor and inspired air.

* * * * *